(12) United States Patent
Yang et al.

(10) Patent No.: US 10,562,017 B2
(45) Date of Patent: Feb. 18, 2020

(54) ION ADSORPTION OF OXIDE LAYERS TO HINDER CATALYST SINTERING

(71) Applicant: GM Global Technology Operations LLC, Detroit, MI (US)

(72) Inventors: Ming Yang, Troy, MI (US); Gongshin Qi, Troy, MI (US); Ryan J. Day, Waterford, MI (US); Xingcheng Xiao, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 3 days.

(21) Appl. No.: 15/399,151

(22) Filed: Jan. 5, 2017

(65) Prior Publication Data
US 2018/0185831 A1 Jul. 5, 2018

(51) Int. Cl.
*B01J 35/00* (2006.01)
*B01J 23/42* (2006.01)
(Continued)

(52) U.S. Cl.
CPC ........... *B01J 35/0013* (2013.01); *B01J 23/42* (2013.01); *B01J 23/44* (2013.01); *B01J 37/08* (2013.01)

(58) Field of Classification Search
CPC ........ B01J 35/0013; B01J 23/42; B01J 23/44; B01J 35/0033; B01J 37/08
See application file for complete search history.

(56) References Cited

U.S. PATENT DOCUMENTS

| 3,656,915 A | 4/1972 | Tourtellotte |
| 9,314,771 B2 | 4/2016 | D'Souza et al. |

(Continued)

FOREIGN PATENT DOCUMENTS

| CA | 1323360 C | 10/1993 |
| CN | 102909005 A | 2/2013 |

(Continued)

OTHER PUBLICATIONS

Liang et al.; "Stabilization of Supported Metal Nanoparticles Using an Ultrathin Porous Shell" ACS Catal., 2011, 1 (10), pp. 1162-1165, Aug. 15, 2011.

(Continued)

*Primary Examiner* — James A Fiorito
(74) *Attorney, Agent, or Firm* — Harness, Dickey & Pierce, P.L.C.

(57) ABSTRACT

Catalysts that are resistant to high-temperature sintering and methods for preparing such catalysts that are resistant to sintering at high temperatures are provided. The catalyst may be prepared by contacting a solution comprising an ionic species with one or more charged surface regions of a catalyst support. A surface of the catalyst support further includes one or more catalyst particles disposed adjacent to the one or more charged surface regions. The ionic species has a first charge opposite to a second charge of the one or more charged surface regions. Next, the ionic species is associated with the one or more charged surface regions to form a layer on the one or more select surface regions. The layer is calcined to generate a coating comprising metal oxide on the one or more select surface regions, where the coating is formed adjacent to the one or more catalyst particles.

15 Claims, 2 Drawing Sheets

(51) Int. Cl.
*B01J 23/44* (2006.01)
*B01J 37/08* (2006.01)

(56) References Cited

U.S. PATENT DOCUMENTS

| | | | |
|---|---|---|---|
| 9,649,627 | B1 | 5/2017 | Xiao et al. |
| 9,731,273 | B2 | 8/2017 | D'Souza et al. |
| 9,901,907 | B1 | 2/2018 | Xiao et al. |
| 10,376,872 | B2 | 8/2019 | Xiao et al. |
| 2004/0232049 | A1* | 11/2004 | Dath ............... B01J 21/16 208/143 |
| 2005/0170957 | A1 | 8/2005 | Maus et al. |
| 2006/0120936 | A1 | 6/2006 | Alive et al. |
| 2010/0248957 | A1* | 9/2010 | Takeshima ....... B01D 53/945 502/439 |
| 2011/0311422 | A1 | 12/2011 | Bentele et al. |
| 2013/0267411 | A1* | 10/2013 | Woodfield ........ B01J 23/83 502/303 |
| 2017/0095795 | A1 | 4/2017 | Xiao et al. |
| 2017/0095796 | A1 | 4/2017 | Qi et al. |
| 2017/0095806 | A1 | 4/2017 | Qi et al. |
| 2017/0095807 | A1 | 4/2017 | Xiao et al. |
| 2017/0114458 | A1 | 4/2017 | Xiao et al. |
| 2018/0111111 | A1 | 4/2018 | Yang et al. |
| 2018/0111112 | A1 | 4/2018 | Yang et al. |
| 2018/0185832 | A1 | 7/2018 | Xiao et al. |
| 2018/0214859 | A1 | 8/2018 | Qi et al. |
| 2018/0214860 | A1 | 8/2018 | Qi et al. |

FOREIGN PATENT DOCUMENTS

| | | |
|---|---|---|
| CN | 103191750 A | 7/2013 |
| CN | 105246590 A | 1/2016 |
| CN | 107020153 A | 8/2017 |
| CN | 108273497 A | 7/2018 |
| CN | 108273568 A | 7/2018 |
| CN | 108355649 A | 8/2018 |
| CN | 108371950 A | 8/2018 |
| DE | 102017101237 A1 | 8/2017 |
| DE | 102018100081 A1 | 7/2018 |
| DE | 102018100092 A1 | 7/2018 |
| DE | 102018101610 | 8/2018 |
| DE | 102018101702 | 8/2018 |

OTHER PUBLICATIONS

M. Astier et al.; "Sintering and Catalysis"; vol. 10 of the seriew Materials Science Research; G.C. Kuczynski (ed.), Sintering and Catalysis, Plenum Press, New York, 1975; pp. 63 and 64.

Xiao, Xingcheng et al.; U.S. Appl. No. 15/010,937 filed Jan. 29, 2016 entitled "Sinter-Resistant Low-Cost Catalysts Manufactured By Solution-Based Nanoparticle Coating Processes"; 30 pages.

Xiao, Xingcheng et al.; U.S. Appl. No. 15/399,179 filed Jan. 5, 2017 entitled "Solution-Based Approach To Make Porous Coatings For Sinter-Resistant Catalysts"; 46 pages.

Qi, Gongshin et al.; U.S. Appl. No. 15/419,263 filed Jan. 30, 2017 entitled "Highly Stable Platinum Group Metal (PGM) Catalyst Systems"; 37 pages.

Qi, Gongshin et al.; U.S. Appl. No. 15/418,214 filed Jan. 27, 2017 entitled "Sinter-Resistant Stable Catalyst Systems By Trapping Of Mobile Platinum Group Metal (PGM) Catalyst Species"; 59 pages.

First Office Action for Chinese Patent Application No. 201710043844.8 dated Jan. 21, 2019 with English language machine translation, 16 pages.

Lin, Hsin-Yu et al. "The mechanism of reduction of cobalt by hydrogen." *Materials Chemistry and Physics*, 85 (2004), pp. 171-175.

Sun, Zhenyu et al., "Thermal-Stable Carbon Nanotube-Supported Metal Nanocatalysts by Mesoporous Silica Coating," *Langmuir* 2011, 27, 10, pp. 6244-6251; DOI: 10.1021la1050871 (Published online: Apr. 11, 2011) (Abstract Only).

Li et al., A sintering-resistant Pd/SiO2 catalyst by reverse-loading nano iron oxide for aerobic oxidation of benzyl alcohol, RSC Advances 5 , 2015, pp. 4766-4769 (Published Dec. 10, 2014); DOI: 10.1039/c4ra14498h.

Xiao, Xingcheng et al., U.S. Appl. No. 16/454,709 filed Jun. 27, 2019 entitled "Solution-Based Approach to Make Porous Coatings for Sinter-Resistant Catalysts," 44 pages.

U.S. Appl. No. 16/454,709, filed Jun. 27, 2019, Xingcheng Xiao et al.
U.S. Appl. No. 15/010,937, filed Jan. 29, 2016, Xiao et al.
U.S. Appl. No. 15/399,179, filed Jan. 5, 2017, Xiao et al.
U.S. Appl. No. 15/418,214, filed Jan. 27, 2017, Qi et al.
U.S. Appl. No. 15/419,263, filed Jan. 30, 2017, Qi et al.

* cited by examiner

ION ADSORPTION OF OXIDE LAYERS TO HINDER CATALYST SINTERING

INTRODUCTION

This section provides background information related to the present disclosure which is not necessarily prior art.

The present disclosure relates to catalyst systems that are resistant to sintering at high temperatures and low-cost methods for preparing catalysts that are resistant to sintering at high temperatures.

Metal nanoparticles can make up the active sites of catalysts used in a variety of applications, such as for the production of fuels, chemicals and pharmaceuticals, and for emissions control from automobiles, factories, and power plants. Because metal nanoparticles tend to agglomerate, this decreases their surface area and active site accessibility, so they are often coupled to support materials. The supports physically separate the metal nanoparticles to prevent agglomeration, and to increase their surface area and active site accessibility. Thus, catalyst systems typically include one or more catalyst compounds; a porous catalyst support material; and one or more optional activators.

After continued use, especially at elevated temperatures, catalyst systems including supported metal nanoparticles lose catalytic activity due to sintering, e.g., thermal deactivation that occurs at high temperatures. Through various mechanisms, sintering results in changes in metal particle size distribution over a support and an increase in mean particle size; hence, a decrease in surface area for the active catalyst compounds. For example, particle migration and coalescence is a form of sintering where particles of metal nanoparticles move or diffuse across a support surface, or through a vapor phase, coalesce with another nanoparticle, leading to nanoparticle growth. Ostwald ripening is another form of sintering where migration of mobile species are driven by differences in free energy and local atom concentrations on a support surface. After sintering processes occur, catalyst activity can decrease. Therefore, catalyst systems are often loaded with a sufficient amount of supported metal nanoparticles to account for a loss of catalytic activity over time and to continue to have the ability to meet, for example, emissions standards over a long period of operation at high temperatures.

Various techniques have been employed to decrease sintering of metal catalysts. For example, metals have been alloyed with other metals, metal nanoparticles have been encapsulated with amorphous coatings by, for example, atomic layer deposition, and strong metal nanoparticle anchoring on supports have been attempted. However, these chemistry-based techniques have resulted in only limited success. Accordingly, there remains a need for improved catalysts that are sinter-resistant.

SUMMARY

This section provides a general summary of the disclosure, and is not a comprehensive disclosure of its full scope or all of its features.

In various aspects, the present disclosure provides methods of preparing catalyst systems that are resistant to sintering. The catalyst system may include at least one catalyst active material, a catalyst support, and a coating. In one aspect, the present disclosure provides a method of preparing a sinter resistant catalyst system, where the method includes contacting a solution including an ionic species with one or more charged surface regions of a catalyst support. A surface of the catalyst support further includes one or more catalyst particles disposed adjacent to the one or more charged surface regions. Further, the ionic species has a first charge opposite to a second charge of the one or more charged surface regions. The method thus includes associating the ionic species with the one or more charged surface regions to form a layer on the one or more select surface regions. The layer may be calcined to generate a coating including metal oxide on the one or more select surface regions. The coating is formed adjacent to the one or more catalyst particles.

In one variation, the first charge of the ionic species is negative and the second charge of the one or more charged surface regions is positive, so that the negatively charged ionic species binds to the positively charged surface regions of the catalyst support.

In another variation, the first charge of the ionic species is positive and the second charge of the one or more charged surface regions is negative, so that the positively charged ionic species binds to the negatively charged surface regions of the catalyst support.

In one variation, prior to the contacting, the method further includes pretreating one or more regions of the surface of the catalyst support with a precursor to increase a point of zero charge (PZC) in the one or more charged surface regions. The precursor includes an element selected from the group consisting of: potassium (K), sodium (Na), barium (Ba), strontium (Sr), zinc (Zn), lanthanum (La), cerium (Ce), cobalt (Co), yttrium (Y), and combinations thereof.

In one variation, a pH of the solution may be less than the PZC of the one or more charged regions.

In one variation, prior to the contacting, the method further includes pretreating one or more regions of the surface of the catalyst support with a precursor to decrease a point of zero charge (PZC) in the one or more charged surface regions. The precursor includes an element selected from the group consisting of: titanium (Ti), antimony (Sb), tungsten (W), and combinations thereof.

In one variation, a pH of the solution may be greater than the PZC of the one or more charged regions.

In another variation, the ionic species includes an element selected from the group consisting of: aluminum (Al), cerium (Ce), zirconium (Zr), iron (Fe), titanium (Ti), silicon (Si), and combinations thereof.

In one variation, the metal oxide is selected from the group consisting of: aluminum oxide ($Al_2O_3$), cerium oxide ($CeO_2$), zirconium oxide ($ZrO_2$), iron oxide ($Fe_2O_3$), titanium dioxide ($TiO_2$), silicon dioxide ($SiO_2$), and combinations thereof.

In one variation, the support includes a metal oxide selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

In one variation, the catalyst particle includes a metal selected from the group consisting of: platinum (Pt), ruthenium (Ru), rhodium (Rh), palladium (Pd), osmium (Os), iridium (Ir), gold (Au), iron (Fe), nickel (Ni), manganese (Mn), and combinations thereof. In variations where the catalyst is a platinum group metal catalyst, a metal may be selected from the group consisting of: platinum (Pt), ruthenium (Ru), rhodium (Rh), palladium (Pd), osmium (Os), iridium (Ir), gold (Au), and combinations thereof.

In one variation, the calcining the layer includes heating the layer at greater than or equal to about 300° C. to less than or equal to about 600° C. for a time period of greater than or equal to about 2 hours to less than or equal to about 10 hours.

In one variation, the catalyst support is in a powder form and the contacting further includes mixing the catalyst support in powder form and the solution including the ionic species to form a mixture. After the associating of the ionic species with the one or more charged surface regions to form a layer on the one or more select surface regions, the method further includes filtering the mixture to collect a filtrate including the catalyst support having the layer; and drying the filtrate prior to the calcining.

In other aspects, the present disclosure provides a method of preparing a sinter resistant catalyst system. The method includes contacting a solution including an anionic species with one or more positively charged surface regions of a catalyst support. A surface of the catalyst support further includes one or more catalyst particles disposed adjacent to the one or more positively charged surface regions. The method further includes associating the anionic species with the one or more positively charged surface regions to form a layer on one or more select surface regions of the catalyst support. The method also includes calcining the layer to generate a coating including metal oxide on the one or more select surface regions. The coating is formed adjacent to the one or more catalyst particles and the metal oxide is selected from the group consisting of: aluminum oxide ($Al_2O_3$), cerium oxide ($CeO_2$), zirconium oxide ($ZrO_2$), iron oxide ($Fe_2O_3$), titanium dioxide ($TiO_2$), silicon dioxide ($SiO_2$), and combinations thereof.

In one variation, prior to the contacting, the method further includes pretreating one or more regions of the surface of the catalyst support with a precursor to increase a point of zero charge (PZC) in the one or more positively charged surface regions. The precursor includes an element selected from the group consisting of: potassium (K), sodium (Na), barium (Ba), strontium (Sr), zinc (Zn), lanthanum (La), cerium (Ce), cobalt (Co), yttrium (Y), and combinations thereof.

In one variation, the anionic species includes an anion represented by a formula $[M(OH)_x]^{y-}$, where M is an element selected from the group consisting of: aluminum (Al), cerium (Ce), zirconium (Zr), iron (Fe), titanium (Ti), silicon (Si), barium (Ba), strontium (Sr), zinc (Zn), lanthanum (La), cobalt (Co), yttrium (Y), copper (Cu), nickel (Ni), manganese (Mn), vanadium (V), and combinations thereof, and x ranges from 1 to 6 and y ranges from 1 to 5.

In one variation, a pH of the solution is less than a point of zero charge (PZC) of the one or more positively charged surface regions.

In other aspects, the present disclosure provides yet other methods of preparing a sinter resistant catalyst system. The method may include contacting a solution including a cationic species with one or more negatively charged surface regions of a catalyst support. A surface of the support further includes one or more catalyst particles disposed adjacent to the one or more negatively charged surface regions. The cationic species may be associated with the one or more negatively charged surface regions to form a layer on one or more select surface regions of the support. The, the layer may be calcined to generate a coating including metal oxide on the one or more select surface regions. The coating is formed adjacent to the one or more catalyst particles. The metal oxide is selected from the group consisting of: aluminum oxide ($Al_2O_3$), cerium oxide ($CeO_2$), zirconium oxide ($ZrO_2$), iron oxide ($Fe_2O_3$), titanium dioxide ($TiO_2$), silicon dioxide ($SiO_2$), and combinations thereof.

In one variation, a pH of the solution is greater than a point of zero charge (PZC) of the one or more negatively charged surface regions.

In one variation, prior to the contacting, the method may further include pretreating one or more regions of the surface of the catalyst support with a precursor to decrease a point of zero charge (PZC) in the one or more charged surface regions. The precursor optionally includes an element selected from the group consisting of: titanium (Ti), antimony (Sb), tungsten (W), and combinations thereof.

In one variation, the cationic species includes a cation represented by a formula $[M(NH_3)_m]^{n+}$, where M is an element selected from the group consisting of: aluminum (Al), cerium (Ce), zirconium (Zr), iron (Fe), titanium (Ti), silicon (Si), barium (Ba), strontium (Sr), zinc (Zn), lanthanum (La), cobalt (Co), yttrium (Y), copper (Cu), nickel (Ni), manganese (Mn), vanadium (V), and combinations thereof, and m ranges from 1 to 6 and n ranges from 1 to 5.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
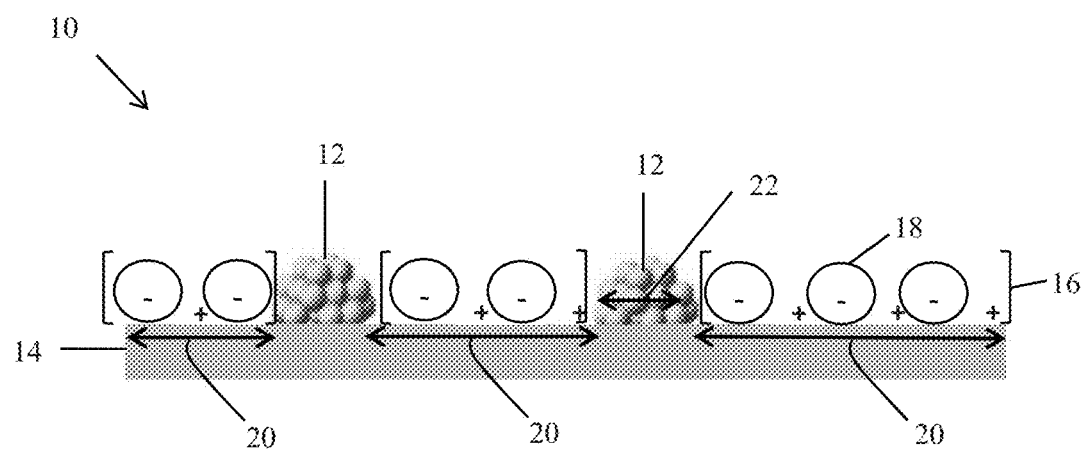
FIG. 1 is an illustration of a sinter-resistant catalyst system prepared according to certain aspects of the present technology that involves anionic adsorption of ionic species on one or more positively charged regions of a catalyst support.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges. As referenced to herein, ranges are, unless specified otherwise, inclusive of endpoints and include disclosure of all distinct values and further divided ranges within the entire range. Thus, for example, a range of "from A to B" or "from about A to about B" is inclusive of A and B.

Example embodiments will now be described more fully with reference to the accompanying drawings.

Chemistry-based approaches for stabilizing metal nanoparticles have been met with limited success. Accordingly, the present technology provides a solution-based approach for minimizing or eliminating the sintering process that may otherwise occur with catalyst particles. This approach generates coatings selectively distributed on surfaces of catalyst supports having metal particles bound thereto, which decreases catalyst activity loss by suppressing aging caused by sintering. The current solution-based approach, relative to other chemistry-based approaches, is a wet-chemistry process, which results in a higher thermal durability and reduces catalyst metal loading requirements, which can potentially lead to significant cost savings. The present technology can be self-limiting and may obstruct fewer active sites on active catalyst particles relative to other coating methods that may entirely coat the surface of the catalyst metal particles and/or to result in multiple coating layers, so that a potential loss in the number of available catalyst active sites may occur.

In certain aspects, the coating of the present technology may be selectively deposited and may inhibit sintering in part by physical separation of adjacent catalyst metal particles. For example, relative to a conventional catalyst system having the same catalyst and support material, but lacking the coating, the present technology may reduce a catalyst metal loading requirement by greater than or equal to about 30%, greater than or equal to about 40%, greater than or equal to about 50%, greater than or equal to about 60%, greater than or equal to about 70%, greater than or equal to about 80% or great than or equal to about 90%, such as from greater than or equal to about 30% to less than or equal to about 90%, from greater than or equal to about 40% to less than or equal to about 80%, from greater than or equal to about 50% to less than or equal to about 80%, from about greater than or equal to 60% to less than or equal to about 80%, or from greater than or equal to 70% to less than or equal to about 80%. In other aspects, relative to a conventional catalyst system having the same catalyst and support material, but lacking the coating, the present technology may reduce a lightoff temperature by greater than or equal to about 10° C., optionally greater than or equal to about 20° C., and in certain variations, optionally reduce a lightoff temperature from greater than or equal to about 30° C.

Accordingly, the present technology provides a method for preparing a catalyst through a solution-based approach. Initially, the method may include binding at least one catalyst to a catalyst support. The catalyst may be a nanoparticle. The catalyst particle optionally comprises one or more platinum group metals (PGM), one or more noble group metals, or the like. For example, the catalyst may comprise one or more platinum group metals, such as ruthenium (Ru), rhodium (Rh), palladium (Pd), osmium (Os), iridium (Ir), platinum (Pt), or combinations thereof; noble metals, such as ruthenium (Re), copper (Cu), silver (Ag), gold (Au), or combinations thereof; or other metals, such as iron (Fe), nickel (Ni), manganese (Mn), sodium (Na), potassium (K), magnesium (Mg), calcium (Ca), barium (Ba), or combinations thereof. For example, the catalyst particle optionally comprises a metal selected from the group consisting of: platinum (Pt), ruthenium (Ru), rhodium (Rh), palladium (Pd), osmium (Os), iridium (Ir), gold (Au), iron (Fe), nickel (Ni), manganese (Mn), and combinations thereof. In one variation, the catalyst may comprise platinum (Pt), palladium (Pd), or mixtures thereof.

The catalyst may have a maximum diameter of greater than 0 nm to less than or equal to about 10 nm, such as a diameter of about 1 nm, about 2 nm, about 3 nm, about 4 nm, about 5 nm, about 6 nm, about 7 nm, about 8 nm, about 9 nm, or about 10 nm. In certain instances, the catalyst may have a diameter equal to that of an atomic species.

The catalyst support may comprise a metal oxide. The catalyst support may be in the form of a plurality of particulates (e.g., a powder) or a monolith structure (e.g., a honeycomb structure) that may be coated with a washcoat layer that includes the catalyst material. In certain variations, the support comprises a metal oxide selected from the group consisting of: cerium oxide ($CeO_2$), aluminum oxide/alumina ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof. The catalyst support may further comprise dopants. The catalyst support may comprise dopants selected from the group consisting of barium (Ba), cerium (Ce), lanthanum (La), phosphorus (P), and combinations thereof. As will be discussed herein, one or more select regions of a surface of the catalyst support may be further pretreated with a precursor to modify a zero point charge (PZC) in those regions.

If the catalyst support is a monolith structure that includes a washcoat layer, the monolith structure may be formed from any the metal oxides discussed above, perovskites, zeolites, and combinations thereof. The washcoat layer may include the same or different metal oxides to form a porous ceramic layer including the catalyst material. The washcoat precursor including the catalyst material(s) can be applied to a surface of the catalyst support and then heat treated, e.g., calcined to form a porous ceramic washcoat layer including the catalyst material dispersed therein.

In other aspects, the support may be provided in a plurality of particles (e.g., powder). In such variations, the support may have an average particle diameter of greater than or equal to about 0.8 μm to less than or equal to about 5 μm, greater than or equal to 1 μm to less than or equal to about 4 μm, greater than or equal to 1.5 μm to less than or equal to about 3.5 μm, or greater than or equal to 2 μm to less than or equal to about 3 μm, such as a diameter of about 0.8 μm, 1 μm, 1.5 μm, 2 μm, 2.5 μm, 3 μm, 3.5 μm, 4 μm, 4.5 μm, or 5 μm.

After binding a catalyst particle to a catalyst support, also referred to herein as a "supported particle," the method may optionally comprise pretreating the supported particle system.

In certain instances, the catalyst support of the supported particle may be treated with various heat treatments, acid or base washes, or modified with dopants or heteroatoms. For example, one or more regions of the surface of the supported particle system may be treated with a precursor to increase a point of zero charge (PZC) and thus modify a charge in the one or more regions of the surface. Notably, the one or more regions of the catalyst support surface are those that are exposed and adjacent to or near the catalyst that is also bound on the surface. Thus, the catalyst on the supported particle remains uncoated with the precursor, while the precursor binds to and/or reacts with the catalyst support material. In certain variations, where a point of zero charge (PZC) of the surface of the catalyst support is increased, the precursor includes an element selected from the group consisting of: potassium (K), sodium (Na), barium (Ba), strontium (Sr), zinc (Zn), lanthanum (La), cerium (Ce), cobalt (Co), yttrium (Y), and combinations thereof. In such a variation, the precursor introduces one or more heteroatoms onto the surface of the support that serve to increase the point of zero charge (PZC). In increasing the PZC of the one or more surface regions on the support, those regions are thus charged and have a higher propensity to associate with (e.g., adsorb or bind to) an ionic (e.g., anionic) species.

In an alternative variation, one or more regions of the surface of the support are pretreated with a precursor to decrease a point of zero charge (PZC) in the one or more charged surface regions and thus modify a charge in the one or more regions of the surface. The precursor in such a variation may include an element selected from the group consisting of: titanium (Ti), antimony (Sb), tungsten (W), and combinations thereof. The precursor introduces one or more heteroatoms onto the surface of the support that serve to decrease the point of zero charge (PZC). In decreasing the PZC of the one or more surface regions on the support, those regions are thus charged and have a higher propensity to associate with (e.g., adsorb or bind to) an ionic (e.g., cationic) species.

In various instances, the surface of the catalyst support has a PZC of greater than or equal to about 2 to less than or equal to about 8. In certain instances, the surface of the catalyst support has a PZC greater than or equal to about 7. In other instances, the surface of the catalyst support has a PZC of less than about 7.

It should be noted that certain catalyst supports may not require pre-treatment with a precursor to introduce one or more heteroatoms on the surface, as the support surface regions may bear sufficiently charge to desirably associate with an ionic species, as further discussed herein.

In various aspects, the present disclosure provides methods of preparing catalyst systems that are resistant to sintering. In one aspect, the present disclosure provides a method of preparing a sinter resistant catalyst system that includes contacting a solution including an ionic species with one or more charged surface regions of a support. A surface of the support further includes one or more catalyst particles disposed adjacent to the one or more charged surface regions, so that the one or more charged surface regions are discrete from the regions bound to the catalyst particles. Further, the ionic species has a first charge opposite to a second charge of the one or more charged surface regions.

The method thus includes associating the ionic species with the one or more charged surface regions to form a layer on the one or more select surface regions. Such an association process is self-limiting. Thus, the layer may then be calcined to generate a coating including metal oxide on the one or more select surface regions. The coating may be porous. The coating is formed adjacent to the one or more catalyst particles.

The solution that is contacted with the catalyst support surface may comprise a solvent. Non-limiting examples of solvents include water, an alcohol, or other organic solute. In certain aspects, the solution is aqueous. Though reference is made herein to an aqueous solution, it is understood that in certain instances other solvents may be used. For example only, the solvent may be an alcohol, or other organic solvent. As will be described further below, the pH of the solution may be adjusted to be greater than or less than a PZC of the one or more charged regions of the surface of the catalyst support, depending on the charge of the ionic species to be deposited. The pH of the solution may be modified by adding acids, bases, buffers, and the like. For example, in certain instances, the pH of the solvent may be maintained by adding diluted $HNO_3$.

The term solution is intended to encompass suspensions having particles distributed therein. Therefore, the catalyst support with the catalyst particles may be present at a weight ratio of greater than or equal to 1:1 to less than or equal to 1:1000 with respect to the solution. In certain instances, the solution and the supported particle mixture may form a diluted catalyst-water suspension. In other instances, the solution and the supported particle(s) may form a more concentrated slurry having a higher viscosity.

The solution also comprises the one or more ionic species that will associate with the one or more charged surface regions of the support and will form the coating comprising metal oxide after the calcining. Thus, the ionic species may include an element selected from the group consisting of: aluminum (Al), cerium (Ce), zirconium (Zr), iron (Fe), titanium (Ti), silicon (Si), barium (Ba), strontium (Sr), zinc (Zn), lanthanum (La), cobalt (Co), yttrium (Y), copper (Cu), nickel (Ni), manganese (Mn), vanadium (V) and combinations thereof. In certain instances, the ionic species include such metals that may form salts with soluble nitrates, acetates, sulfates, oxalates, weak base hydroxides, or combinations thereof. As non-limiting examples, salts of Al include $Al(NO_3)_3$, $Al_2(SO_4)_3$, $Al(CH_3CO_2)_3$, and $Al_2C_6O_{12}$; salts of Ba include $BaC_2O_4$, $Ba(NO_3)_2$, $C_4H_6BaO_4$, and $BaSO_4$; salts of Sr include $SrSO_4$, $Sr(NO_3)_2$, $Sr(CH_3CO_2)_2$, and $SrC_2O_4$; salts of Zn include $Zn(NO_3)_2$, $C_4H_6O_4Zn$, $ZnSO_4$, $ZnC_2O_4$; salts of La include $La_2(C_2O_4)_3$, $La(NO_3)_3$, $La(CH_3CO_2)_3$, and $La_2(SO_4)_3$; salts of Ce include $Ce(SO_4)_2$, $Ce(CH_3CO_2)_3$, $Ce(NO_3)_3$, and $Ce_2(C_2O_4)_3$; salts of Co include $CoC_2O_4$, $Co(NO_3)_2$, $CoSO_4$, and $C_4H_6CoO_4$; salts of Y include $(CH_3CO_2)_3Y$, $Y(NO_3)_3$, $Y_2(SO_4)_3$, and $Y_2(C_2O_4)_3$; salts of Ti include $Ti(NO_3)_4$, $Ti(C_2H_3O_2)_4$, $Ti(SO_4)_2$, and $Ti(C_2O_4)_2$; and any combinations of these salts may be employed in solution. In one variation, the metal salt may comprise Al and be selected from the group consisting of $Al(NO_3)_3$, $Al_2(SO_4)_3$, $Al(CH_3CO_2)_3$, and $Al_2C_6O_{12}$ and combinations thereof.

The ionic species may thus be a cationic species that will associate with (e.g., adsorb or bind to) one or more negatively charged surface regions on the support. Alternatively, the ionic species may be an anionic species that will associate with one or more positively charged surface regions on the support.

In one variation, the ionic species is an anionic species that includes an anion represented by a formula $[M(OH)_x]^{y-}$ formed following hydrolysis within the aqueous solution, where x ranges from 1 to 6 and y ranges from 1 to 4. M may be an element selected from the group consisting of: aluminum (Al), cerium (Ce), zirconium (Zr), iron (Fe), titanium (Ti), silicon (Si), barium (Ba), strontium (Sr), zinc (Zn), lanthanum (La), cobalt (Co), yttrium (Y), copper (Cu), nickel (Ni), manganese (Mn), vanadium (V), and combinations thereof. Non-limiting examples include aluminum hydroxide anion ($[Al(OH)_4]^-$), cerium hydroxide anion ($[Ce(OH)_4]^-$), zirconium hydroxide ion ($[Zr(OH)_4]^-$), and the like.

In another variation, the ionic species is a cationic species that includes a cation represented by a formula $[M(NH_3)_m]^{n+}$ formed following hydrolysis within the aqueous solution, where m ranges from 1 to 6 and n ranges from 1 to 5. M may be an element selected from the group consisting of: aluminum (Al), cerium (Ce), zirconium (Zr), iron (Fe), titanium (Ti), silicon (Si), barium (Ba), strontium (Sr), zinc (Zn), lanthanum (La), cobalt (Co), yttrium (Y), copper (Cu), nickel (Ni), manganese (Mn), vanadium (V), and combinations thereof. Non-limiting examples include $[Ce(NH_3)_4]^{4+}$, $[Ce(NH_3)_4]^{3+}$, $[Co(NH_3)_6]^{2+}$, $[Co(NH_3)_6]^{4+}$, $[Fe(NH_3)_4]^{2+}$, $[Fe(NH_3)_6]^{3+}$, $[Cu(NH_3)_4]^{2+}$, $[Cu(NH_3)_4]^+$, and the like.

In certain instances, an ionic species is present in an amount of greater than 0 weight % to less than or equal to about 20 weight % of the overall solution.

In certain variations, the catalyst support having one or more catalysts may be in the form of a monolithic support, so that the contacting with the solution may include applying the solution to a surface of a monolithic support. Such applying may include spreading the solution over the surface of the catalyst support or immersing the catalyst support in a bath of the solution. In other variations, the catalyst support bearing one or more catalysts may be in the form of supported particle(s), for example, a powder. In such a variation, the contacting of the supported particle(s) with the solution comprising the ionic species may include introducing the supported particle(s) into the solution and mixing them together. In certain instances, the ionic species and the catalyst suspension or slurry is stirred at a temperature greater than 0° C. and less than or equal to 80° C. for a period greater or equal to a few minutes and less than or equal to a few days. In other instances, the solution comprising the ionic species and the catalyst suspension or slurry may be milled at a temperature greater than 0° C. and less than or equal to 80° C. for a period greater or equal to a few minutes and less than or equal to a few days.

As noted above, the ionic species associates with the one or more charged surface regions of the support to form a self-limiting layer of the ionic species. The ionic species/coating precursors can form radicals in solution. The radicals may be positively or negatively charged. The association process may include adsorbing and/or ionic bonding between the ionic species and the one or more charged surfaces. By adjusting the pH of the solution (e.g., suspension including the ionic species and the catalyst support), the radicals and the surface of the catalyst support will have opposite charges. The opposite charges will attract and the coating radicals will bind to the catalyst support to form an oxide coating layer. In certain instances, anion adsorption of the coating layer onto the catalyst supports may occur, where the ionic species is anionic. In other instances, cation adsorption of the coating layer onto the catalyst support may occur, where the ionic species is cationic. The coating process occurs only so far as to neutralize the electron charge. Therefore, once the surface is neutralized electronically, no additional layers are added providing a self-limiting reaction. The species/radicals will bind stably onto the support as a confined layer to neutralize the electron charge of the catalyst support. Because the coating process is self-limiting, over-coating is effectively reduced. The present oxide coating effectively hinders the sintering of the supported particles. Further, the oxide coating avoids covering the catalyst metal particles or at least partially avoids covering the catalyst metal particles so that high amounts of the active sites remain exposed and accessible to passing fluids.

Where the support is in a powder form and the contacting further includes mixing the support in powder form and the solution including the ionic species, a mixture is formed. After the associating of the ionic species with the one or more charged surface regions to form a layer on the one or more select surface regions is completed, the method may further includes filtering the mixture to collect a filtrate including the support having the layer; and drying the filtrate prior to the calcining. In certain instances, the mixture is filtered and dried under ambient air at a temperature greater than or equal to ambient (e.g., room temperature or about 21° C.) to less than or equal to 100° C. for a time period of greater than or equal to a few minutes to less than or equal to three days. In other instances, the mixture is filtered and dried under negative pressure or vacuum conditions at a temperature greater than or equal to room temperature to less than or equal to 100° C. for a time period of greater than or equal to a few minutes to less than or equal to three days. In certain instances, a water wash on the filtrate may be completed after filtration.

The method also comprises calcining the metal precursors to generate a metal oxide coating on the catalyst support. Calcining includes heating the catalyst support including the layer formed from the ionic species coated thereon and the catalyst at a temperature of greater than or equal to about 300° C. to less than or equal to about 600° C. for a time of greater than or equal to about 2 hours to less than or equal to about 10 hours. The metal oxide that forms the coating is optionally selected from the group consisting of: aluminum oxide ($Al_2O_3$), cerium oxide ($CeO_2$), zirconium oxide ($ZrO_2$), iron oxide ($Fe_2O_3$), titanium dioxide ($TiO_2$), silicon dioxide ($SiO_2$), and combinations thereof.

The catalyst system may include at least one catalyst active material, a catalyst support, and a self-limiting coating comprising one or more metal oxides. With reference to FIG. 1, the current technology also provides a catalyst system 10 in the form of a monolithic structure that resists sintering and retains catalytic activity after prolonged exposure to elevated temperatures. The catalyst system 10 can be a catalyst system generated by anionic adsorption.

Such a method may include contacting a solution including an anionic species with one or more positively charged surface regions of a support. The catalyst system 10 includes catalyst metal nanoparticles 12 bound to a catalyst support 14 (metal oxide support). In certain instances, the metal nanoparticles 12 are either directly or indirectly coupled to the catalyst support 14. A self-limiting oxide coating 16 is formed over one or more charged surface regions 20 of the catalyst support 14. The surface regions 20 are independent from, but adjacent to the regions of the catalyst support 14 bearing the catalyst metal nanoparticles 12.

After a solution including an anionic species is contacted with the one or more positively charged surface regions 20 on catalyst support 14, the anionic species is associated with the one or more positively charged surface regions 20 to form a layer on one or more select surface regions of the support. In one variation, a pH of the solution is less than a point of zero charge (PZC) of the one or more positively charged surface regions. The method also includes calcining the layer to generate the self-limiting oxide coating 16. The oxide coating may include a metal oxide selected from the group consisting of: aluminum oxide ($Al_2O_3$), cerium oxide ($CeO_2$), zirconium oxide ($ZrO_2$), iron oxide ($Fe_2O_3$), titanium dioxide ($TiO_2$), silicon dioxide ($SiO_2$), and combinations thereof.

The catalyst particles (e.g., metal nanoparticles 12) may have a loading density on the catalyst support 14 of greater than or equal to about 0.25% (w/w) to less than or equal to about 20% (w/w), such as a loading density of about 0.25% (w/w), about 0.5% (w/w), about 1% (w/w), about 1.5% (w/w), about 2% (w/w), about 2.5% (w/w), about 3% (w/w), about 3.5% (w/w), about 4% (w/w), about 4.5% (w/w), about 5% (w/w), about 5.5% (w/w), about 6% (w/w), about 6.5% (w/w), about 7% (w/w), about 7.5% (w/w), about 8% (w/w), about 8.5% (w/w), about 9% (w/w), about 9.5% (w/w), or about 10% (w/w). In certain instances, the loading density of the metal nanoparticles 12 on the catalyst support 14 is about 1.5% (w/w).

As described above in regard to the method of preparing a catalyst, the nanoparticles 12 may comprise platinum group metal (PGM) nanoparticles, such as nanoparticles of Ru, Rh, Pd, Os, Ir, or Pt, a noble metal, such as nanoparticles of Re, Cu, Ag, Au, other metals such as nanoparticles of Fe, Ni, Mn, Na, K, Mg, Ca, or Ba, or combinations thereof. In certain variations, the nanoparticles 12 may have a maximum average diameter 22 of greater than or equal to about 2 nm to less than or equal to about 10 nm, such as a diameter of about 2 nm, about 3 nm, about 4 nm, about 5 nm, about 6 nm, about 7 nm, about 8 nm, about 9 nm, or about 10 nm.

As noted above, the catalyst support 14 optionally comprises a metal oxide. In this variation, where the one or more positively charged surface regions 20 are present on the catalyst support 14, the catalyst support 14 may be any of the materials described above, including by way of non-limiting example, a material selected from the group consisting of $Al_2O_3$, $CeO_2$, $ZrO_2$, perovskites, zeolites, and combinations thereof. Nonetheless, it is understood that this group of metal oxides is not limited and that other metal oxides may be employed for the catalyst support 14.

It should be noted the metal oxide catalyst support 14 may have shapes or forms other than a planar structure as shown in FIG. 1, for example, it may have conventional monolith or honeycomb shapes or the catalyst support may be in the form of beads for a packed bed catalyst. Moreover, the catalyst support 14 has a surface area of greater than or equal to about 50 $\mu m^2/g$ to less than or equal to about 150 $\mu m^2/g$, greater than or equal to about 75 $\mu m^2/g$ to less than or equal to about 125, $m^2/g$ such as a surface area of about 75 $\mu m^2/g$, about 80 $\mu m^2/g$, about 90 $\mu m^2/g$, about 100 $m^2/g$, about 110, $m^2/g$ about 120 $\mu m^2/g$, about 130 $\mu m^2/g$, about 140 $\mu m^2/g$, about 145 m²/g, or about 150 μm²/g. In other variations, the catalyst support 14 may be in the form of particulates, such as particles or powder. In such a variation, while not shown, the catalyst support particles may have a maximum average diameter of greater than or equal to about 0.8 μm to less than or equal to about 5 μm, greater than or equal to 1 μm to less than or equal to about 4 μm, greater than or equal to 1.5 μm to less than or equal to about 3.5 μm, or greater than or equal to 2 μm to less than or equal to about 3 μm, such as a diameter of about 0.8 μm, about 1 μm, about 1.5 μm, about 2 μm, about 2.5 μm, about 3 μm, about 3.5 μm, about 4 μm, about 4.5 μm, or about 5 μm. Once in solution, the charge of the surface of the catalyst support 14 varies with respect to the acidity of the solution.

With renewed reference to FIG. 1, the coating 16 is formed from a coating precursor or ionic species. In certain instances, the ionic species may be a salt of Al, Ba, Sr, Zn, La, Ce, Co, Y, Cu, Ni, Mn, V, or any combinations thereof, which may allow for anion adsorption of a coating layer onto the catalyst support. The ionic species/coating precursor forms coating radicals with respect to the acidity of the solution, (i.e., the charge of the ionic species/radical is dependent upon the pH of the solution) as described above. For example only, the anionic species may include an anion represented by a formula $[M(OH)_x]^{y-}$ following hydrolysis within a solution, where M is an element selected from the group consisting of: aluminum (Al), cerium (Ce), zirconium (Zr), iron (Fe), titanium (Ti), silicon (Si), and combinations thereof, and x ranges from 1 to 6 and y ranges from 1 to 5. In one variation, a pH of the solution is less than a point of zero charge (PZC) of the one or more positively charged surface regions. In certain variations, where the ionic species is anionic, the solution may have a pH greater than 7. The opposing charges of the anionic species 18 and the one or more positively charged surface regions 20 of the catalyst support 14 initiates the coating process. The negatively charged anionic species 18 binds to the positively charge surface of the catalyst support 14. Thus, once the surface is neutralized electronically, no additional layers are added. The bound ionic species 18 selectively forms a layer that after calcining process (described above), which effectively hinders the sintering of the supported nanoparticles 14 and does not inadvertently cover active sites of the supported nanoparticles 14 (e.g., avoids covering the catalyst metal nanoparticles 14 or at least partially avoids covering the catalyst metal nanoparticles 14).

Figure 2:
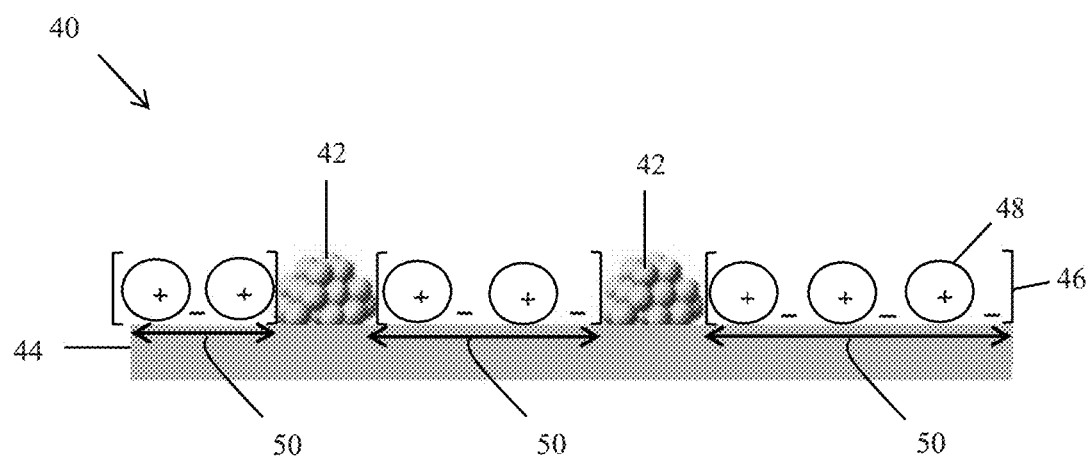
FIG. 2 is an illustration of a sinter-resistant catalyst system prepared according to other aspects of the present technology that involves cationic adsorption of ionic species on one or more negatively charged regions of a catalyst support.

With reference to FIG. 2, the current technology also provides a catalyst system 40 in the form of a monolithic structure that resists sintering and retains catalytic activity after prolonged exposures to elevated temperatures. The catalyst system 40 can be a catalyst system generated by cationic adsorption. Such a method may include contacting a solution including a cationic species with one or more negatively charged surface regions of a support. The catalyst system 40 includes catalyst metal nanoparticles 42 bound to a catalyst support 44 (metal oxide support).

Like the embodiment in FIG. 1, the catalyst metal nanoparticles 42 are either directly or indirectly coupled to the catalyst support 44. To the extent not otherwise discussed herein, the various components and their properties may be the same in the catalyst system 40 in FIG. 2 as the catalyst system 10 in FIG. 1, and for brevity, will not be repeated herein.

After a solution including a cationic species is contacted with the one or more negatively charged surface regions 50 on catalyst support 44, the cationic species is associated with the one or more negatively charged surface regions 50 to form a layer on one or more select surface regions of the support 44. In one variation, a pH of the solution is greater than a point of zero charge (PZC) of the one or more negatively charged surface regions. The method also includes calcining the layer to generate a self-limiting oxide coating 46 formed over one or more charged surface regions 50 of the catalyst support 44. The surface regions 50 are independent from, but adjacent to the catalyst metal nanoparticles 42.

In this variation, where the surface of the catalyst support 44 includes the one or more negatively charged surface regions 50, the catalyst support 44 may include a metal oxide material selected from the group consisting of $Al_2O_3$, $SiO_2$, and combinations thereof. Nonetheless, it is understood that this group of metal oxides is not limited and that other metal oxides may be employed for the catalyst support 44. Once in solution, the charge of the surface of the catalyst support 44 varies with respect to the acidity of the solution. It should be noted the catalyst metal oxide support 44 may have shapes or forms other than a planar structure as shown in FIG. 2, for example, it may have conventional monolith or honeycomb shapes, the catalyst support may be in the form of beads for a packed bed catalyst, or the catalyst may be in the form of particles or powder.

The coating 46 is thus formed from a layer of a cationic species 48 being deposited onto the one more negatively charged surface regions 50. The self-limiting oxide coating 46 may include a metal oxide selected from the group consisting of: aluminum oxide ($Al_2O_3$), cerium oxide ($CeO_2$), zirconium oxide ($ZrO_2$), iron oxide ($Fe_2O_3$), titanium dioxide ($TiO_2$), silicon dioxide ($SiO_2$), and combinations thereof.

In certain instances, the cationic species 48 may be a salt of Al, Ba, Sr, Zn, La, Ce, Co, Y, or combinations thereof, which may allow for cation adsorption of a coating layer onto the catalyst support. The ionic species/coating precursor forms coating radicals with respect to the acidity of the solution, (i.e., the charge of the ionic species/radical is dependent upon the pH of the solution), as described above. For example only, the cationic species may include a cation represented by a formula $[M(NH_3)_m]^{n+}$, where M is an element selected from the group consisting of: aluminum (Al), cerium (Ce), zirconium (Zr), iron (Fe), titanium (Ti), silicon (Si), and combinations thereof, and m ranges from 1 to 6 and n ranges from 1 to 5.

In one variation, a pH of the solution is greater than a point of zero charge (PZC) of the one or more negatively charged surface regions. In certain variations, where the ionic species is cationic, the solution may have a pH of less than 7. The opposing charges of the cationic species 48 and the one or more positively charged surface regions 50 of the catalyst support 44 initiates the coating process. The positively charged cationic species 48 binds to the positively charge surface of the catalyst support 44. Thus, once the surface is neutralized electronically, no additional layers are added. The bound ionic species 48 selectively forms a layer that after calcining process (described above), which effectively hinders the sintering of the supported catalyst nanoparticles 42 and further does not inadvertently cover active sites of the catalyst nanoparticles 42 (e.g., avoids covering the catalyst metal nanoparticles 42 or at least partially avoids covering the catalyst metal nanoparticles 42).

The coatings 16 and 46 may cover a large area of otherwise exposed surface area of the metal oxide support. In various embodiments, the coatings 16 and 46, respectively, may cover greater than or equal to about 5% to less than or equal to about 100% of the exposed surfaces of the catalyst support, or greater than or equal to about 20% to less than or equal to about 90% of the exposed surfaces of the support. The exposed surfaces of the catalyst supports 14 and 44 refer to the portions of the respective catalyst supports 14 and 44 to which catalyst metal nanoparticles 12, 42 are not bound. A total amount of surface area coverage of the support including both the metal nanoparticles and metal oxide nanoparticles (forming the coatings) is greater than or equal to about 50% to less than or equal to about 100%. The coating 16 or 46 prevents or minimizes metal catalyst particles nanoparticles from coalescing. Therefore, the coatings 16 or 46 may render the catalyst systems resistant to sintering or thermal degradation.

In certain instances, pores may be defined within the coatings (coating 16 in FIG. 1 or coating 46 in FIG. 2) having an average diameter of greater than or equal to about 0.5 nm to less than or equal to about 30 nm, such as a diameter of about 0.5 nm, about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, or about 20 nm. The coating thus formed may have a porosity, i.e., a volume of pores relative to the volume of coating, of greater than or equal to about 20% to less than or equal to about 70%, such as a porosity of about 20%, about 30%, about 40%, about 50%, about 60%, or about 70%.

Embodiments of the present technology are further illustrated through the following non-limiting examples:

Example 1

A powder of supported nanoparticles comprising PGM nanoparticles (e.g., Pt, Pd, or a combination thereof) bound to an $Al_2O_3$ (alumina) support is contacted with an aqueous solution. A controlled amount of a coating precursor (e.g., $Al^{3+}$) is added to the aqueous solution including the supported nanoparticles comprising PGM nanoparticles bound to an alumina support. The solution has a pH greater than 7. The coating precursors form negatively charged coating radicals. The surface of the catalyst support is positively charged. The mixture is fully stirred or milled at a temperature greater than 0° C. and less than or equal to 80° C. for a period greater than or equal to a few minutes and less than or equal to a few days. The mixture is then filtrated and dried in ambient air or a vacuum at a temperature greater than or equal to room temperature to less than or equal to 100° C. for a time period greater than or equal to a few minutes to less than or equal to three days. The dry powder is then calcined at a temperature of greater than or equal to about 300° C. to less than or equal to about 600° C. for a time of greater than or equal to about 2 hours to less than or equal to about 10 hours to generate the metal oxide coating.

The coated-supported nanoparticles and a control of supported nanoparticles without a coating are subject to hydrothermal ageing at about 950° C. for about 48 hours. To evaluate activity, CO and $C_3H_6$ oxidation reactions are used ($CO+O_2$; $C_3H_6+O_2$). In one instance, a stream of 5000 ppm, 1.0% $O_2$, 5% $H_2O$ is flowed over the catalyst as reaction temperature is increased. In the other instance, a stream of 500 ppm $C_3H_6$, 1.0% $O_2$, 5% $H_2O$ is flowed over the catalyst as reaction temperature is increased. In both instances, the ramping rate is 2° C. per/minute from about 100° C. to about 350° C. The total flow rate is 0.5 L/minute with a balance consisting of $N_2$ gas. The amount of CO and $C_3H_6$ is detected post-catalyst is measured to evaluate the extent of the reaction in either instance, (i.e., coated and non-coated supported nanoparticles). One metric used to evaluate activity is $T_{50}$ (light-off temperature), which is the temperature at which 50% of the CO and $C_3H_6$ streams are being oxidized over the catalyst, respectively.

After subjecting the control of supported nanoparticle and the coated-supported nanoparticles to the gaining conditions described above with respect to the CO oxidation reaction, the control of the supported nanoparticles and the coated nanoparticles provide $T_{50}$ values of 234° C. and 219° C., respectively. Thus, the coating provided a 15° C. decrease in the $T_{50}$ value. After subjecting the control of supported nanoparticles and the coated-supported nanoparticles to the gaining conditions described above with respect to the $C_3H_6$ oxidation reaction, the control of the supported nanoparticles and the coated-supported nanoparticles provided $T_{50}$ values of 253° C. and 232° C., respectively. Thus, the coating provided a 21° C. decrease in the $T_{50}$ value. It is desirable to have low $T_{50}$ values.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preparing a sinter resistant catalyst system, the method comprising:

contacting one or more surface regions of a surface of a catalyst support with one or more precursors to increase a point of zero charge (PZC) of the one or more surface regions so as to form one or more charged surface regions, wherein the surface of the catalyst support comprises one or more catalyst particles adjacent to the one or more charged surface regions and wherein the one or more precursors are selected from the group consisting of: potassium (K), sodium (Na), barium (Ba), strontium (Sr), zinc (Zn), lanthanum (La), cerium (Ce), cobalt (Co), yttrium (Y), and combinations thereof;

contacting a solution comprising an ionic species with the one or more charged surface regions of the catalyst support so as to form a layer on the one or more charged surface regions, wherein the ionic species has a first charge opposite to a second charge of the one or more charged surface regions;

and calcining the layer to generate a coating comprising metal oxide on the one or more charged surface regions, wherein the coating is formed adjacent to the one or more catalyst particles on the surface of the catalyst support, wherein the calcining the layer comprises heating the layer at greater than or equal to about 300° C. to less than or equal to about 600° C. for a time period of greater than or equal to about 2 hours to less than or equal to about 10 hours.

2. The method according to claim 1, wherein the first charge of the ionic species is negative and the second charge of the one or more charged surface regions is positive, so that the negatively charged ionic species binds to the positively charged surface regions of the catalyst support; or the first charge of the ionic species is positive and the second charge of the one or more charged surface regions is negative, so that the positively charged ionic species binds to the negatively charged surface regions of the catalyst support.

3. The method according to claim 1, wherein a pH of the solution is less than the PZC of the one or more charged regions.

4. The method according to claim 1, wherein the ionic species comprises an element selected from the group consisting of: aluminum (Al), cerium (Ce), zirconium (Zr), iron (Fe), titanium (Ti), silicon (Si), and combinations thereof.

5. The method according to claim 1, wherein the metal oxide is selected from the group consisting of: aluminum oxide ($Al_2O_3$), cerium oxide ($CeO_2$), zirconium oxide ($ZrO_2$), iron oxide ($Fe_2O_3$), titanium dioxide ($TiO_2$), silicon dioxide ($SiO_2$), and combinations thereof.

6. The method according to claim 1, wherein the catalyst support comprises a metal oxide selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

7. The method according to claim 1, wherein the catalyst particle comprises a metal selected from the group consisting of: platinum (Pt), ruthenium (Ru), rhodium (Rh), palladium (Pd), osmium (Os), iridium (Tr), gold (Au), iron (Fe), nickel (Ni), manganese (Mn), and combinations thereof.

8. The method according to claim 1, wherein the catalyst support is in a powder form and the contacting further comprises mixing the solution comprising the ionic species with the catalyst support to form a mixture, and after the associating, the method further comprises filtering the mixture to collect a filtrate comprising the catalyst support having the layer; and drying the filtrate prior to the calcining.

9. A method of preparing a sinter resistant catalyst system, the method comprising:
contacting one or more surface regions of a surface of a catalyst support with one or more precursors to increase a point of zero charge (PZC) of the one or more surface regions so as to form one or more positively charged surface regions, wherein the surface of the catalyst support comprises one or more catalyst particles adjacent to the one or more positively charged surface regions and wherein the one or more precursors are selected from the group consisting of: potassium (K), sodium (Na), barium (Ba), strontium (Sr), zinc (Zn), lanthanum (La), cerium (Ce), cobalt (Co), yttrium (Y), and combinations thereof;
contacting a solution comprising an anionic species with the one or more positively charged surface regions of a catalyst support so as to form a layer on the one or more positively charged surface regions,
and
calcining the layer to generate a coating comprising metal oxide on the one or more select surface regions, wherein the coating is formed adjacent to the one or more catalyst particles on the surface of the catalyst support and the metal oxide is selected from the group consisting of: aluminum oxide ($Al_2O_3$), cerium oxide ($CeO_2$), zirconium oxide ($ZrO_2$), iron oxide ($Fe_2O_3$), titanium dioxide ($TiO_2$), silicon dioxide ($SiO_2$), and combinations thereof, wherein the calcining the layer comprises heating the layer at greater than or equal to about 300° C. to less than or equal to about 600° C. for a time period of greater than or equal to about 2 hours to less than or equal to about 10 hours.

10. The method according to claim 9, wherein the anionic species comprises an anion represented by a formula $[M(OH)_x]^{y-}$, where M is an element selected from the group consisting of: aluminum (Al), cerium (Ce), zirconium (Zr), iron (Fe), titanium (Ti), silicon (Si), barium (Ba), strontium (Sr), zinc (Zn), lanthanum (La), cobalt (Co), yttrium (Y), copper (Cu), nickel (Ni), manganese (Mn), vanadium (V), and combinations thereof, and x ranges from 1 to 6 and y ranges from 1 to 5.

11. The method according to claim 9, wherein a pH of the solution is less than a point of zero charge (PZC) of the one or more positively charged surface regions.

12. The method according to claim 9, wherein the anionic species is selected from the group consisting of: aluminum hydroxide anion ($[Al(OH)_4]^-$), cerium hydroxide anion ($[Ce(OH)_4]^-$), zirconium hydroxide ($[Zr(OH)_4]^-$), and combinations thereof.

13. The method of claim 1, comprising:
contacting the solution comprising a cationic species with one or more negatively charged surface regions of the catalyst support, wherein the surface of the catalyst support further comprises the one or more catalyst particles disposed adjacent to the one or more negatively charged surface regions;
associating the cationic species with the one or more negatively charged surface regions to form the layer on one or more select surface regions of the catalyst support; and
calcining the layer to generate the coating comprising metal oxide on the one or more select surface regions, wherein the coating is formed adjacent to the one or more catalyst particles on the surface of the catalyst support and the metal oxide is selected from the group consisting of: aluminum oxide ($Al_2O_3$), cerium oxide ($CeO_2$), zirconium oxide ($ZrO_2$), iron oxide ($Fe_2O_3$), titanium dioxide ($TiO_2$), silicon dioxide ($SiO_2$), and combinations thereof.

14. The method according to claim 13, wherein a pH of the solution is greater than a point of zero charge (PZC) of the one or more negatively charged surface regions.

15. The method according to claim 13, wherein the cationic species comprises a cation represented by a formula $[M(NH_3)_m]n^+$, where M is an element selected from the group consisting of: aluminum (Al), cerium (Ce), zirconium (Zr), iron (Fe), titanium (Ti), silicon (Si), barium (Ba), strontium (Sr), zinc (Zn), lanthanum (La), cobalt (Co), yttrium (Y), copper (Cu), nickel (Ni), manganese (Mn), vanadium (V), and combinations thereof, and m ranges from 1 to 6 and n ranges from 1 to 5.

* * * * *